US007249660B2

(12) United States Patent
Mackiewicz

(10) Patent No.: US 7,249,660 B2
(45) Date of Patent: Jul. 31, 2007

(54) DRUM BRAKE

(75) Inventor: John Edmund Mackiewicz, Niles, MI (US)

(73) Assignee: Robert Bosch GmbH, Stuttgart (DE)

( * ) Notice: Subject to any disclaimer, the term of this patent is extended or adjusted under 35 U.S.C. 154(b) by 28 days.

(21) Appl. No.: 11/164,496

(22) Filed: Nov. 25, 2005

(65) Prior Publication Data

US 2007/0119673 A1    May 31, 2007

(51) Int. Cl.
*F16D 51/00*    (2006.01)
(52) U.S. Cl. ...................... 188/326; 188/362
(58) Field of Classification Search ............. 188/326, 188/362, 365, 366
See application file for complete search history.

(56) References Cited

U.S. PATENT DOCUMENTS

| | | | | |
|---|---|---|---|---|
| 2,140,778 A | * | 12/1938 | White .................. | 188/362 |
| 2,580,701 A | * | 1/1952 | Rasmussen et al. ......... | 188/363 |
| 2,712,367 A | * | 7/1955 | Schnell .................. | 188/326 |
| 3,232,388 A | * | 2/1966 | Gancel .................. | 188/326 |
| 3,357,526 A | * | 12/1967 | Thirion .................. | 188/326 |
| 3,377,076 A | * | 4/1968 | Burnett .................. | 277/582 |
| 3,811,538 A | * | 5/1974 | Farr .................... | 188/79.62 |
| 3,915,461 A | * | 10/1975 | Gautier .................. | 277/453 |
| 3,973,473 A | * | 8/1976 | Bate .................... | 92/52 |
| 4,156,532 A | * | 5/1979 | Kawaguchi et al. ........ | 277/587 |
| 4,220,227 A | | 9/1980 | Kluger | |
| 4,249,646 A | | 2/1981 | Roberts | |
| 4,364,456 A | | 12/1982 | Colpert | |
| 4,369,863 A | * | 1/1983 | Farr et al. .............. | 188/106 A |
| 4,387,901 A | * | 6/1983 | Ritsema ................. | 277/584 |
| 4,449,757 A | * | 5/1984 | Rath et al. .............. | 303/9.72 |
| 4,502,574 A | | 3/1985 | Spaargaren | |
| 4,537,293 A | * | 8/1985 | Osborne ................ | 188/196 BA |
| 4,792,021 A | * | 12/1988 | Fukuzawa et al. ........ | 188/79.62 |
| 5,076,593 A | * | 12/1991 | Sullivan et al. ........... | 277/565 |
| 5,311,971 A | | 5/1994 | Courbot | |
| 5,325,940 A | * | 7/1994 | Rueckert et al. ........... | 188/71.8 |
| 5,480,010 A | | 1/1996 | Johannesen | |
| 5,826,681 A | * | 10/1998 | Kubo et al. .............. | 188/71.8 |
| 6,044,936 A | * | 4/2000 | Matsumoto et al. ........ | 188/72.4 |
| 6,206,148 B1 | | 3/2001 | Capek | |
| 6,244,393 B1 | * | 6/2001 | Weidenweber et al. ..... | 188/72.4 |
| 6,349,802 B1 | * | 2/2002 | Juura .................... | 188/73.2 |
| 6,374,962 B1 | | 4/2002 | Doolittle | |
| 6,425,466 B1 | * | 7/2002 | Juura .................... | 188/73.2 |
| 6,435,322 B1 | * | 8/2002 | Ikeda ................... | 188/326 |
| 2002/0053491 A1 | * | 5/2002 | Juura .................... | 188/73.2 |
| 2004/0007431 A1 | * | 1/2004 | Barbosa ................. | 188/72.4 |

* cited by examiner

*Primary Examiner*—Robert A. Siconolfi
(74) *Attorney, Agent, or Firm*—Leo H McCormick, Jr.; Sarah Taylor

(57) ABSTRACT

A drum brake has cylinders symmetrically fixed to a stationary member. Each cylinder has an axial bore therein with a groove for retention of a seal. A piston engages each seal to define chambers that receive pressurized fluid. Webs for friction members have a first end pined to an opposite cylinder and a second end connected to an opposite piston and to each other by a strut. Pressurized fluid acts on the pistons to move the second ends with respect to the first ends and simultaneously bring the friction members into engagement with a drum to effect a brake application. The seals acts on and return the pistons to a rest position in an absence of pressurized fluid. A pawl on a lever is moved into engagement with the strut to bring the first and second friction members into engagement with the drum to manually effect a brake application.

10 Claims, 4 Drawing Sheets

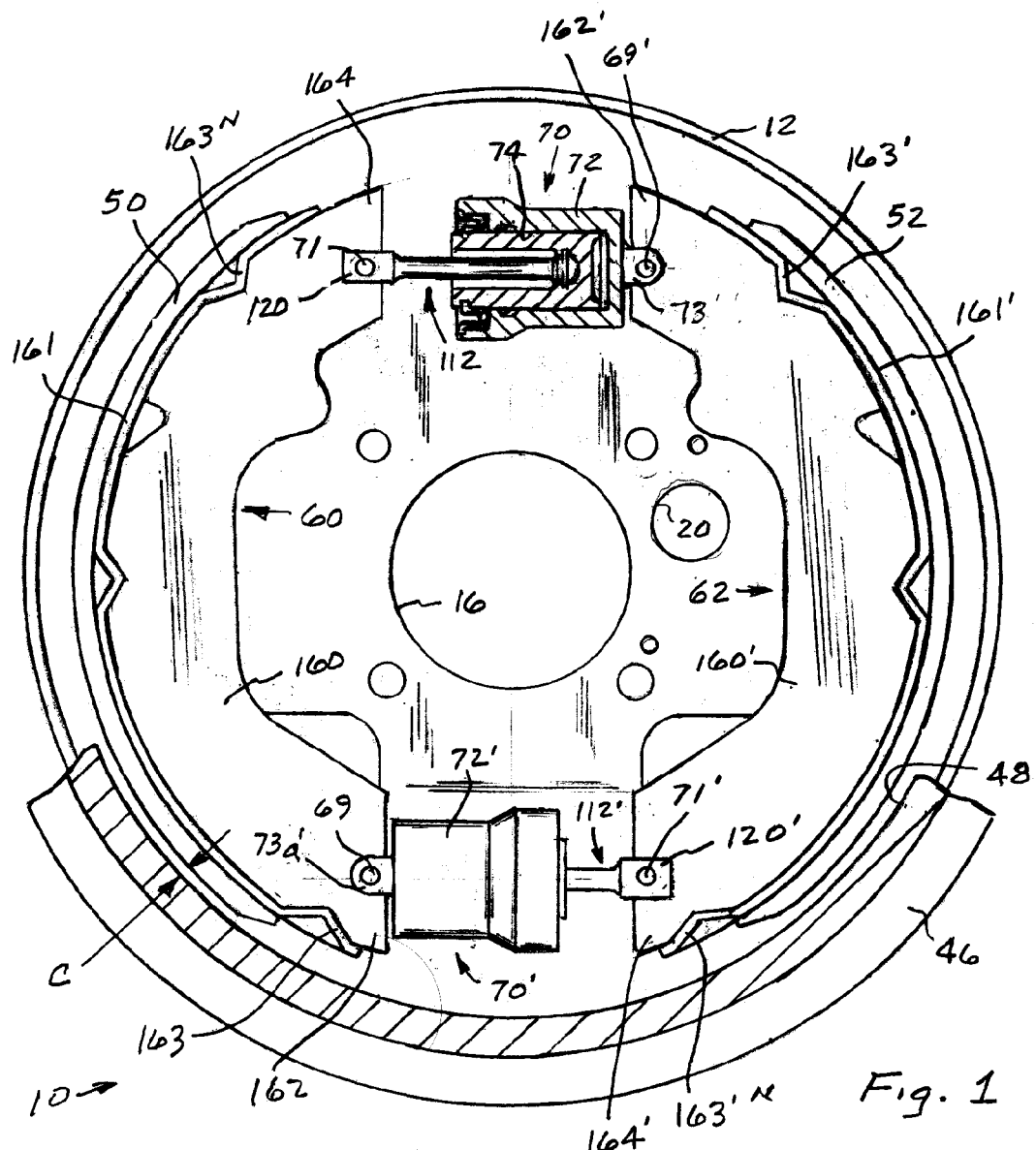
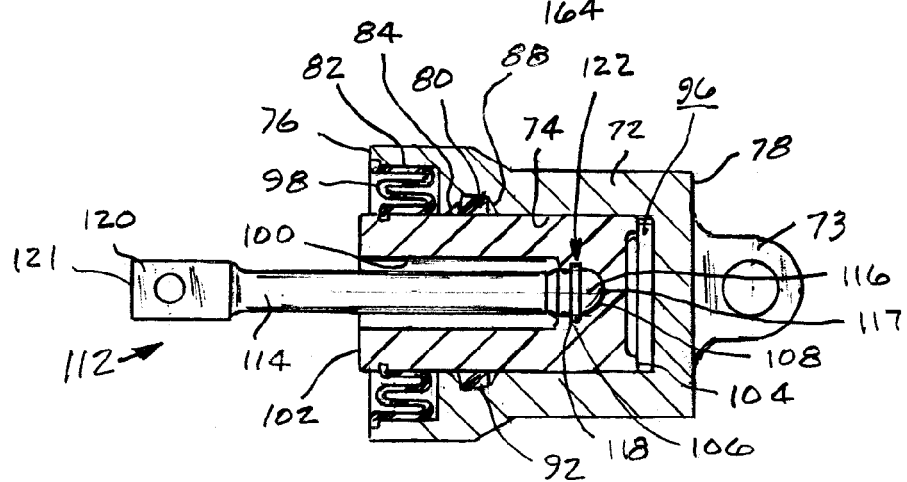
Fig. 1
Fig. 2

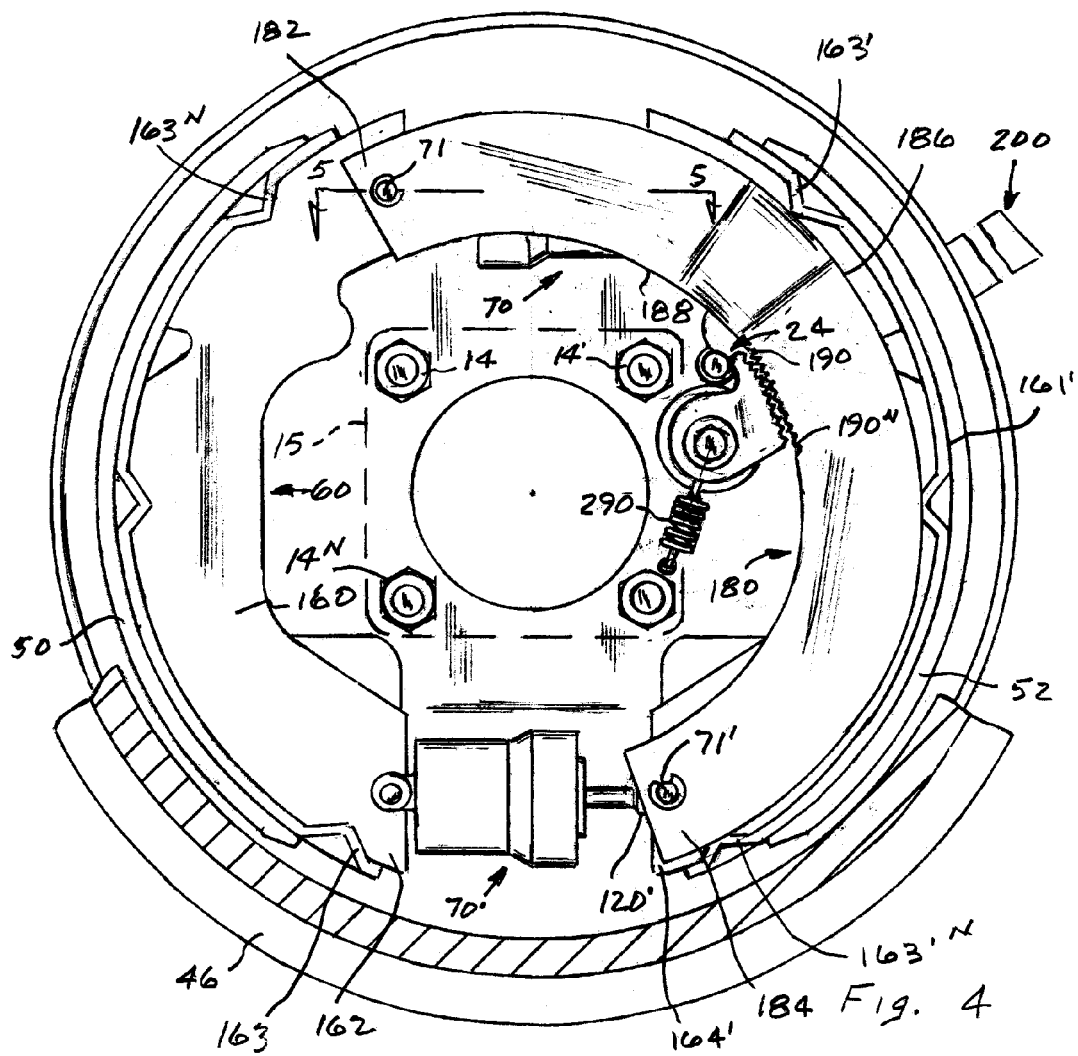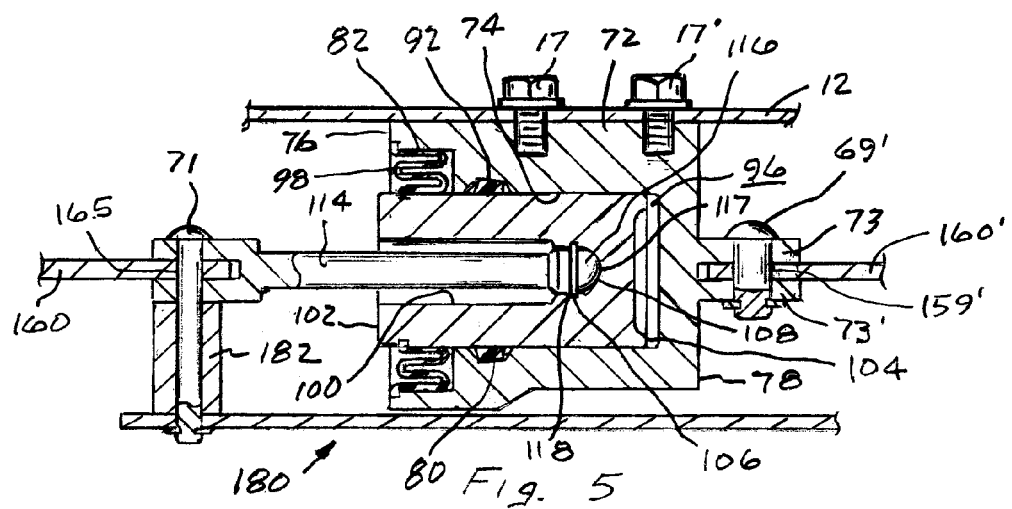

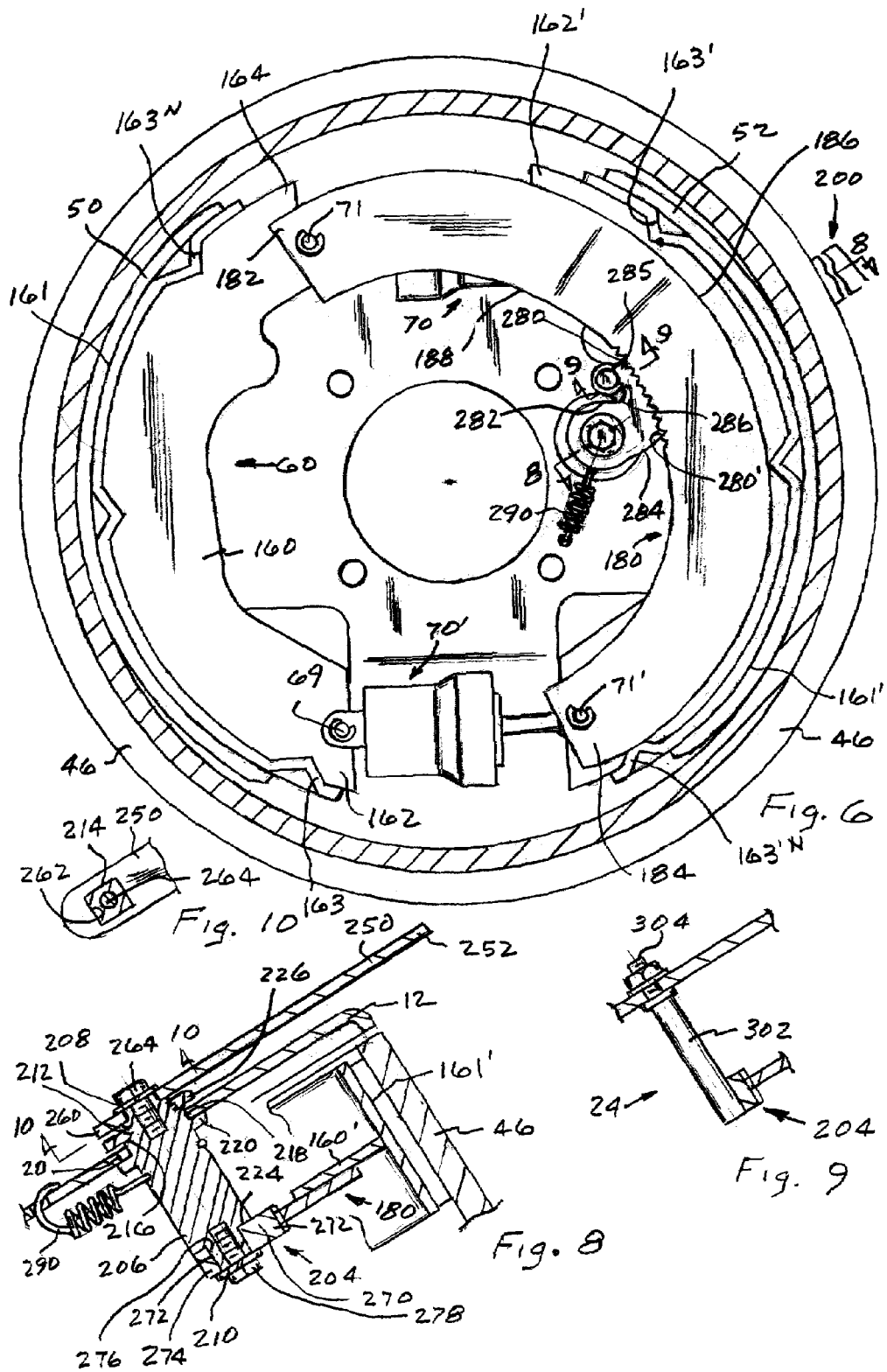

though the web of the brake shoes while first and second spring are

DRUM BRAKE

This invention relates to a drum brake having webs of first and second brake shoes that are simultaneously moved by first and second pistons retained in first and second cylinders symmetrically located about an axis of the drum and wherein the first and second pistons are returned to positions of rest by seals retained in the cylinders.

BACKGROUND OF THE INVENTION

Duo-mode drum brakes of a type disclosed in U.S. Pat. Nos. 4,249,646 and 4,364,456 are frequently used in combination with front wheel disc brakes on a vehicle. Such duo-mode drum brakes are used as a service brake by supplying pressurized hydraulic fluid to a wheel cylinder that acts on and moves a web on first and second brake shoes to bring friction members into engagement with a braking surface on a drum and as a parking brake accepts a manual force that is applied through a lever arm to move the web move and correspondingly the friction members into engagement with the braking surface on the drum. In such a drum brake the first and second brake shoes are retained on a backing plate through the use of pins that extend through the web of the brake shoes while first and second spring are attached to the web to respectively urge the ends of the web into engagement with an anchor and an actuator. The pins allow the brake shoes some lateral movement within a brake drum during a brake application when a leading edge of the friction member on a first brake shoe engages the braking surface to allow an abutment surface on a trailing edge of the friction member on a second shoe is brought in engagement with an anchor to oppose the frictional engagement. As the friction members wear it is necessary to reset the running clearance between the friction members and the braking surface on the drum in order to maintain a distance required to move the friction members during a brake application and to assure that the friction members do not engage the braking surface in an absence of a desire to effect braking, U.S. Pat. Nos. 4,502,574 and 5,480,010 are typical of structure to provide for automatic adjusting of the running clearance. The structure of such drum brakes function in an adequate manner but the many components offer an opportunity for simplification while functioning in a similar manner to effect a brake application.

SUMMARY OF THE INVENTION

It is an object of this invention to provide a drum brake assembly with a minimum of components that functions in a duo-mode as a service brake and a parking brake.

According to this invention, the drum brake assembly for a vehicle including a drum that is rotatable about an axis with an inner cylindrical surface and having a braking surface that receives first and second friction members on first and second brake shoes that are moved from a position of rest by actuation means to effect a desired brake application. The brake assembly is characterized in that the actuation means includes first and second cylindrical bodies that are fixed to a stationary member of the vehicle with each cylindrical body having a bore that extends from a second end toward a first end and a groove in the bore for receiving a square shaped seal. The groove has a chamfer on a radial wall adjacent the second end and a taper on a radial wall nearer to the first end. A piston is located the axial bore in each cylindrical body and engages the seal to define a chamber within the cylindrical body that is connected to receive pressurized fluid from a source. The first brake shoe includes a first web with first end and a second end with the first end pinned to a first end of the second cylindrical body and the second end connected to a first piston in the first cylindrical body through a first linkage. The second brake shoe includes a second web with a first end and second end with the first end thereof pinned to the first cylindrical body and the second end connected to a second piston in the second cylindrical body through a second linkage. An arcuate strut has a first end connected to the second ends of the first and second webs. To effect a service brake application, pressurized fluid is presented to the first and second chambers that acts on the first piston causing the second end of the first web to pivot about its first end that is pinned to the second cylindrical body and move the first friction member into engagement with the braking surface on the drum and acts on the second piston causing the second end of the second web to pivot about its first end that is pinned to the first cylindrical body and move the second friction member into engagement with the braking surface on the drum. The arcuate strut being connected to the second ends of the first and second struts assists in assuring that the first and second friction member simultaneously engage the braking surface. During movement of the first piston from a position of rest, a first portion of the first seal resiliently moves into a first chamfer in the first bore and correspondingly with movement of the second piston from a position of rest a second portion of the second seal resiliently moves into a second chamfer in the second bore. On termination of the presentation of pressurized fluid to the first and second chambers, the first portion of the first seal acts on the first piston and the second portion of the second seal acts on the second piston to return the first and second pistons to positions of rest to set a running clearance between the first and second members and the braking surface. To effect a parking brake application, a manual force is applied to a first lever that moves a pawl on a second lever into engagement with the arcuate strut to provide a force that pushes on the second end of the first web and pulls on the second end of the second web to move the first and second friction members into engagement with braking surface on the drum.

An advantage of this invention resides in the manner in which the first and second friction members are simultaneously moved into engagement with a braking surface on a drum to effect a brake application.

Another advantage of this invention resides in the return of actuation pistons to a position of rest by seals to set a running clearance between first and second friction members and a braking surface on a drum.

A further advantage of the brake assembly resides in the manual application of a force to an arcuated web to simultaneously move first and second webs associated with first and second shoes into engagement with a braking surface to effect a brake application.

A further advantage of this invention resides in a manner in which a running clearance is maintained after each brake application through seals moving pistons to a position of rest and in moving the piston to the position of rest webs for first and second brake shoes are pulled away from a braking surface.

BRIEF DESCRIPTION OF THE DRAWINGS

FIG. 1 is a schematic illustration of a drum brake assembly having backing plate with a sectional view of a first actuator fixed thereto having a first piston retained therein with a first linkage connected to a first web of a first brake shoe and pinned to a second web of a second brake shoe and a second actuator having a second piston connected by a second linkage to the second web of the second brake shoe and pinned to the first web of the first brake shoe wherein a running clearance between a first friction member on the first brake shoe and a second friction member on the second brake shoe and a braking surface on a drum is established through square faced seals that move the first and second pistons to positions of rest according to the present invention;

FIG. 2 is an enlarged view of the first actuator of FIG. 1;

FIG. 4 is a schematic illustration of the drum brake assembly of FIG. 1 with an arcuate strut connecting the webs of the first and second brake shoes;

FIG. 5 is a sectional view taken along lines 5-5 of FIG. 4;

FIG. 6 is a schematic illustration of the drum brake assembly of FIG. 1 with the first and second friction member engaged with the braking surface on the drum;

FIG. 8 is a sectional view taken along lines 8-8 of FIG. 6 showing a lever arrangement through which a manual input is applied to effect a brake application.

FIG. 9 is a sectional view taken along lines 9-9 of FIG. 6 showing a guide; and

FIG. 10 is a sectional view taken along lines 10-10 of FIG. 8 showing a connection for a lever with a shaft through which an input is applied to effect a manual brake application.

DETAILED DESCRIPTION

Figure 7:
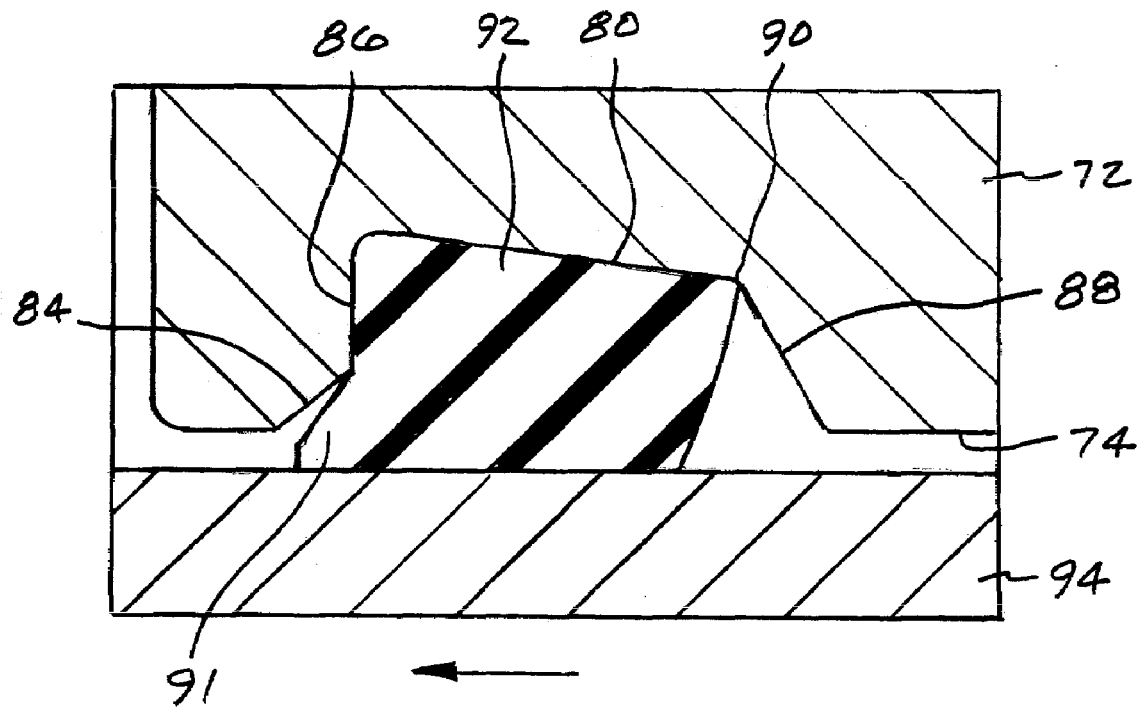
FIG. 7 is an enlarged view showing the relationship of the seal, piston and cylindrical body of FIG. 6.

In the description that follows, components of the drum brake that are identical may be identified by a same number plus ' unless necessary to better describe a functional relationship with another component.

A brake assembly 10 made according to the present invention and intended for use as a service brake and parking brake for a vehicle is shown in FIG. 1. The brake assembly 10 includes a drum 46 that is rotatable about an axis of an axle shaft that has an inner cylindrical surface 48 that defines a braking surface for a first friction member 50 on a first brake shoe 60 and a second friction member 52 on a second brake shoe 62 that are moved by first 70 and second 70' actuation members from a position of rest to effect a desired brake application.

In more detail, the brake assembly 10 includes a backing plate 12 that is fixed by bolts 14, 14' . . . 14" to a stationary member 15 on a vehicle, see FIG. 4. The backing plate 12 has an axial opening 16 therein through which the axle shaft passes, a opening 20 that is offset from the axial opening 16 through which a manual actuation member 200 supplies an input to effect a park brake, a arcuate guide 24 adjacent the axial opening 20 for directing a pawl 204 into engagement with an arcuate strut 180 to effect a park brake application and a peripheral surface 20.

The first 70 and second 70' actuation members are symmetrically positions about the axial opening 16 of the backing plate 12. The section view of the first actuation member 70 shown in FIG. 1 and in more detail in FIGS. 2 and 5 also applies to the second actuation member 70' and each have a cylindrical body 72 that is fixed to the stationary member 15 of the vehicle by bolts 17,17' through the backing plate 12. The cylindrical body 72 has an axial bore 74 that extends from a second end 76 toward a first end 78 with a groove therein 80 therein adjacent a recess 82 on the second end 76. The groove 80 is distinguished by a chamfer 84 that extends from a first wall 86 toward the second end 76 and a taper 88 on a second wall 90 that extends toward the first end 78, see FIG. 7. Projections 73,73a extend from the first end 78 cylindrical body 72 are aligned in a parallel relationship with respect to the backing plate 12 by bolts 17,17'. A square faced seal 92 is located in groove 80 such that on insertion of a piston 94 into the axial bore 74 the piston 94 engages the seal 92 to form a chamber 96 in the cylindrical body 72 that is selectively connected to receive pressurized fluid from a source to effect a brake application. A seal 98 having an accordion shape is located in recess 82 and also engages piston 94 to prevent environmental dust and moisture from being presented to the axial bore 74.

Figure 3:
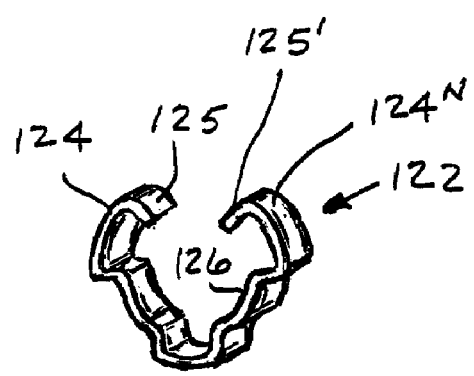
FIG. 3 is a perspective view of a keeper for connecting a shaft of a linkage with a piston.

Piston 94 is distinguished by a closed axial bore 100 that extends from a first end 102 toward a second end 104 with a groove 106 located adjacent a semi-spherical bottom surface 108. A linkage 112 defined by a shaft 114 has a semi-spherical surface 116 on a first end 117, a groove 118 adjacent the semi-spherical surface 116 and a yoke 120 on a second end 121 of the shaft 114. A wire formed retainer 122, as best shown in FIG. 3, has a plurality of lobes 124,124' . . . 124" that radiate from a semi-circular base 126. The semi-circular base 126 is located in groove 118 of shaft 114 prior to insertion of shaft 114 into axial bore 100 of piston 94. To insert the shaft 114 into piston 94, a force is applied to yoke 118 such that the retainer 122 is initially compressed as the lobes 124,124' . . . 124" engage the axial bore 100 adjacent groove 118 as ends 125,125' on the semi-circular base 126 resiliently move toward each other and later expand when lobes 124,124' . . . 124" are located in groove 106 and the semi-spherical surface 116 engages the semi-spherical bottom surface 108 to retain the shaft 114 in piston 94. The linkage 112 is designed to connect actuator 70 with the web 160 of the first friction member 60 of the first shoe 50 in a manner as hereinafter described and a similar linkage 112' is designed to connect actuator 70' with web 160' of the second friction member 62 of the second shoe 52.

The first 50 and 52 second brake shoes are identical and as a result only the first brake shoe 50 is hereinafter specifically described. The first brake shoe 50 has as web 160 that supports a base 161 with an arcuate shape on which a first friction member 60 is retained. Web 160 has a first end 162 with an opening 159 and a second end 164 has and opening 165 therein located along a same radius with respect to the axis of the backing plate 12 while base 161 has a plurality of radial guides 163,163' . . . 163" thereon. The first end 162 of web 160 is attached to the second actuation member 70' by a pin 69 that extends through radial projections 73', 73a' in cylindrical body 72' while the second end 164 of web 160 is connected to yoke 120 of linkage 112 by a pin 71 that extends through opening 165. Similarly the web 160' for the second brake shoe 52 is attached to the first actuation member 70 by a pin 69' that extends through radial projections 73,73' while the second end 164' is connected to yoke 120' of linkage 112' by a pin 71' and as a result web 160 of the first brake shoe 50 and web 160' of the second brake shoe 52 are aligned in a same parallel plane with respect to the backing plate 12.

The second end 164 of web 160 for the first brake shoe 50 is also connected to the second end 164' of web 160' for the second brake shoe 52 by an arcuate strut 180, as illustrated in FIGS. 4 and 6. The arcuate strut 180 is defined by a first end 182 that is connected to yoke 120 of linkage 112 by pin 71 and a second end 184 that is connected to yoke 120' of linkage 112' by pin 71'. The arcuate strut 180 that is offset in a plane that is parallel with the webs 160,160' by spacers 182,182' located on pins 71, 71', see FIG. 5, and has an outer peripheral surface 186 that may engage guides 163, 163' . . . 163" on the base 161' of the second brake shoe 52 and an inner peripheral surface 188 that has a irregular surface defined by a plurality of teeth 190, 190' . . . 190" thereon. The irregular surface is designed to offer resistance to a pawl 202 that is part of the manual input member 200 for effecting a parking brake application.

The manual input member 200 as best shown in FIGS. 4, 6 and 8 has a shaft 206 with a first end 208 and a second end 210 that extends through opening 20 in backing plate 12. Shaft 206 has a threaded surface 212 that extends from a first square or rectangular surface 214 to a first shoulder 216, a smooth cylindrical surface 218 located between shoulder 216 and a flange 220 and a second square or rectangular surface 222 that extends from a second end 210 to a shoulder 224. Shaft 206 is positioned in opening 20 in backing plate with flange 220 engaging the backing plate 12 and a nut 226 is screwed onto threaded surface 212 until nut 226 engages shoulder 216 at which time there is gap between the face on nut 226 and the backing plate 12 and the diameter of the smooth cylindrical surface 218 is smaller than opening 20 such that shaft 206 may freely translate in opening 20. A first lever 205 has a first end 252 and a second end 260 with the first end 252 being connected to cable (not shown) through which a manual input is transmitted to shaft 206 while the second end 260 has a square or rectangular opening 262 that is matched and placed onto the rectangular surface 214 and a screw 264 is attached to the first end 208 to hold the first lever 205 in alignment with the backing plate 12. The pawl 204 is defined by a second lever 270 has a first end 272 and a second end 274 with the second end 274 having a square or rectangular opening 276 that is matched with the rectangular opening 222 and a nut 278 is screwed into the second end 210 of shaft 206 to hold the second lever 270 against shoulder 224. The first end 272 of the pawl 204 is distinguished by a plurality of arcuate teeth 280,280' . . . 280" that extend from a first side 282 to a second side 284. The first side 282 has a curves surface 286 such that projection 285 is formed for the arcuate teeth 280,280' . . . 280" that engages a guide 24 that extends from the backing plate 12. A spring 290 is attached to the backing plate acts on shaft 206 separate the arcuate teeth 280,280' . . . 280" from the plurality of teeth 190, 190' . . . 190n (irregular surface) on strut 180.

The guide 24 is illustrated in FIG. 9 in more detail and is defined by a shaft 302 having a first end 304 that is attached to backing plate 12 and a second end 306 that is positioned adjacent to and engaged by projection 285 on the first end 272 of pawl 204.

For purposes of describing the functional relationship of the components of the brake assembly 10 during a brake application it is assume that drum 46 is turning in a clockwise direction.

When it is desirable to effect a parking brake application, an input force is applied to lever 250 that causes shaft 206 to rotate in opening 20 such that projection 285 engages guide 24 and the plurality of teeth plurality of teeth 280, 280' . . . 280" move into engagement with the plurality of teeth 190, 190' . . . 190" on arcuate strut 180. The manual force is transmitted into the arcuate strut 180 and the first end 182 pushes on the first web 160 through pin 71 while the second end 184 pulls on the second web 160' through pin 71' to move the first friction member 50 and second friction member 52 into engagement with braking surface 48 to effect a brake application, as illustrated in FIG. 6. During such a brake application, the arcuate strut 180 may engage one or more of the guides 163, 163', . . . 163" on web 160' of the second brake shoe 62 such that the force is directed into the pins 71, 71'. When the manual input force terminates, spring 290 acts on shaft 206 to pull teeth 280, 280' . . . 280" out of contact with teeth 190, 190' . . . 190" into a position as illustrated in FIG. 4 and the seals 92,92' return the pistons 74,74' to the positions of rest.

When it is desired to effect a service brake application, pressurized fluid is supplied to chamber 96,96' that acts on pistons 94,94' to develop first and second brake forces in the actuators 70,70' that is transmitted through linkage 112,112' into the first web 160 and through linkage 112' into the second web 160'. The first force acts on end 164 of web 160 causing the second end 164 to pivot about the first end 162 that is pinned to pin 69' that is fixed to the cylinder body 72' attached to backing plate 12 causing the first friction member 50 on the first brake shoe 60 to initially engage the braking surface 48 on drum 46 at a point between the first end 162 and the second end 164 similarly the second force acts on end 164' of web 160' causing the second end 164' to pivot about the first end 162' that is pinned to pin 69' that is fixed to the cylinder body 72 attached to backing plate 12 causing the second friction member 52 on the second brake shoe 62 to initially engage the braking surface 48 on drum 46 at a point between the first end 162' and the second end 164', in a similar manner as illustrated in FIG. 6 for a manual brake application. The movement of the second end 164 of the first web 160 and the second end 164' of the second web 160' occurs at the same time as the second force from piston 94' pushes on web 160' is transmitted into end 184 of strut 180 as the first force from piston 94 pushes end 164' of web 160 and as a result substantially equal forces being transmitted into first 50 and second 52 brake shoes to effect a service brake application.

As pistons 94, 94' are moved within the cylindrical body 72, 72' a portion 91, 91' of seals 92; 92' is resiliently extruded into chamfers 84, 84' of grooves 80, and 80' as illustrated in FIG. 7. When the pressurized fluid to chambers 84, 84' terminates to end a brake application, that portion 91, 91' of the seals 92, 92' acts on piston 94, 94' and moves the piston 94, 94' back toward the chambers 84, 84' such that the first friction member 50 on the first brake shoe 60 and the second friction member 52 on the second brake shoe 62 are moved away from braking surface 48 to establish a running clearance C.

As the first 50 and second 52 friction members wear, the seals 92,92' retain the pistons 94,94' in the cylindrical bodies 72,72' in a position such that running clearance is maintained. The arcuate strut 180 translates in a counter-clockwise direction such that the plurality of teeth 190, 190' . . . 190" thereon move with respect to the plurality of teeth 280, 280' . . . 280" on pawl 204 on the manual input member. In the absence of an input force applied to lever 205, spring 290 holds the pawl away from the arcuate strut 180 and as a result no interference occurs during a service brake application.

During certain brake application, considerable heat may be generated and as a result thermal expansion of the components occurs. Through the structure of the present invention an over adjustment of the running clearance is attenuated as the seals 92, 92' have sufficient resiliency to allow the components to move and yet return to a desired running clearance.

What is claimed is:

1. A brake assembly for a vehicle having a drum that is rotatable about an axis with an inner cylindrical surface thereon defining a braking surface for first and second friction surfaces on first and second brake shoes that are moved from a position of rest by actuation means to effect a desired brake application, said brake assembly being characterized by said actuation means including a first cylindrical body that is fixed to a stationary member of the vehicle, said first cylindrical body having a first bore that extends from a second end toward a first end with a first groove therein and a first chamfer on a first wall of the first groove, a first seal located in said first grove, a first piston located in said first bore engages said first seal to define a first chamber in said first cylindrical body, and a second cylindrical body that is fixed to a stationary member of the vehicle, said second cylindrical body having a second bore that extends from a second end toward a first end with a second groove therein and a first chamfer on a first wall of the second groove, a second seal located in said second groove, a second piston located in said second bore engages said second seal to define a second chamber in said second cylindrical body; and first brake shoe having a first web with first end and a second end with said first end thereof being pinned to said first end of said second cylindrical body and a second end connected to said first piston through a first linkage; and said second brake shoe having a second web with a first end thereof pinned to said first end of said first cylindrical body and a second end connected to said second piston through a second linkage, said first piston and said second piston on pressurized fluid being presented to said first and second chambers respectively responding by moving from positions of rests by said first web on said first brake shoe pivoting about said first end of said second cylindrical body to move said first frictional surface thereon toward and into engagement with said braking surface and by said second web on said second brake shoe pivoting about said first end of said first cylindrical body to move said second frictional surface thereon toward and into engagement with said braking surface to effect the brake application, said first seal on movement of the first piston from its position of rest having a first portion thereof that resiliently moves into said first chamfer in said first bore and said second seal on movement of the second piston from its position of rest having a second portion thereof that resiliently moves into said second chamfer in said second bore and on termination of the presentation of pressurized fluid to said first chamber and said second chamber said first portion of said first seal acts on said first piston and said second portion of said second seal acts on said second piston to return said first and second piston to positions of rest to set a running clearance between said first and second friction surfaces and said braking surface, said reaction forces derived during a brake application are carried into said stationary member through a first pin connected to said first end of said first cylindrical member and a second pin connected to said first end of said second cylindrical member, said first and second cylindrical members being symmetrically positioned with respect to the axis of said drum, said first linkage is defined by a first shaft having a first end pivotally secured to said first piston and a second end that is pivotally secured to said second end of said first web and said second linkage is defined by a second shaft having a first end pivotally secured to said second piston and a second end that is pivotally secured to said second end of said second web, said brake assembly is further characterized by an arcuate strut having a first end connected to said second end of said first linkage and a second end connected to said second end of said second linkage such that movement of said second end of said first piston provides a first force that pulls said second end of said second piston and movement of said second end of said second piston provides a second force that pushes said second end of said first piston during a brake application.

2. The brake assembly as recited in claim 1 wherein said arcuate strut is characterized by a general shape concentric to the braking surface on said drum.

3. The brake assembly as recited in claim 2 wherein said arcuate strut is characterized by an inner face with an engagement surface thereon having a plurality of teeth, said arcuate strut being rotated with respect to said axis of said drum as a function of a change in the rest positions corresponding to wear of said first and second friction surfaces.

4. The brake assembly as recited in claim 3 wherein actuation means is further characterized by a crank member having a axle that is perpendicular to the second web, a lever connected to said axle that is connected to a manual input member and a pawl connected to said axle that is parallel to said second web, said pawl having an engagement end thereon that is adjacent the engagement surface on said inner face of said arcuate strut such that said engagement end engages said engagement surface to impart an input into said arcuate strut in response to an actuation force received from the manual input member to move said first and second friction surfaces into engagement with said braking surface to effect a brake application.

5. The brake assembly as recited in claim 1 wherein said actuation means is further characterized by a resilient member that acts on said axle in an absence of an actuation force applied by the manual input member to hold the pawl away from the engagement surface on said strut.

6. The brake assembly as recited in claim 5 further including a guide that directs said engagement end into said engagement surface to assure that the input is transmitted into the plurality of teeth on said inner face.

7. The brake assembly as recited in claim 6 wherein the point of contact of said engagement end with said plurality of teeth varies as a function of the wear of the first and second friction members.

8. The brake assembly as recited in claim 4 wherein said actuation means is further characterized by a resilient member that acts on said crank member to assure that said arcuate strut freely moves with said first and second brake shoes on retraction by said seals.

9. The drum brake as recited in claim 1 further including a pawl that is moved into engagement to provide an input force that moves the first and second friction members into engagement with the braking surface on the drum to effect a brake application.

10. The drum brake as recited in claim 9 wherein said seals compensate for thermal expansion caused by a brake application to maintain a desired running clearance.

* * * * *